United States Patent
McCune et al.

(10) Patent No.: US 6,173,464 B1
(45) Date of Patent: Jan. 16, 2001

(54) POCKETED BEDDING OR SEATING PRODUCT

(75) Inventors: Richard L. McCune; Joe C. Workman, both of Carthage, MO (US)

(73) Assignee: L&P Property Management Company, South Gate, CA (US)

( * ) Notice: Under 35 U.S.C. 154(b), the term of this patent shall be extended for 0 days.

(21) Appl. No.: 09/307,501

(22) Filed: May 7, 1999

Related U.S. Application Data

(60) Provisional application No. 60/118,767, filed on Feb. 5, 1999.

(51) Int. Cl.[7] .......................... A47C 27/07; A47C 23/04; B68G 9/00
(52) U.S. Cl. .................................. 5/720; 5/716; 5/655.8; 267/91
(58) Field of Search .............................. 5/716, 718, 720, 5/727, 729, 655.7, 655.8, 248, 246, 256, 268, 654.1; 267/91, 94, 108, 90, 86

(56) References Cited

U.S. PATENT DOCUMENTS

| | | | |
|---|---|---|---|
| Re. 18,976 | 10/1933 | Jones | 5/655.8 |
| 837,751 | * 12/1906 | Summers | 5/246 |
| 912,855 | * 2/1909 | King | 5/256 X |
| 1,192,510 | * 7/1916 | Fischmann | 5/655.8 |
| 1,284,384 | * 11/1918 | Lewis | 5/720 |
| 1,434,653 | 11/1922 | Fiss et al. | 5/720 |
| 1,455,847 | 5/1923 | Meutsch | 5/720 |
| 1,466,617 | 8/1923 | Foster | 5/655.8 |
| 1,816,238 | * 7/1931 | Steele | 5/268 X |
| 2,048,979 | * 7/1936 | Trotta et al. | 5/655.8 |
| 2,194,569 | * 3/1940 | Rumpf | 5/716 |
| 2,241,039 | * 5/1941 | Mattison | 5/716 |
| 2,265,251 | * 12/1941 | Reed | 267/86 |
| 2,430,098 | * 11/1947 | Binch | 5/655.8 X |
| 2,567,520 | * 9/1951 | McInerney et al. | 5/248 |
| 2,634,800 | 4/1953 | Clark | 267/95 |
| 2,724,842 | * 11/1955 | Rogovy | 5/248 |
| 3,083,381 | * 4/1963 | Bailey | 5/120 X |
| 3,145,020 | * 8/1964 | Calla | 5/655.7 X |
| 3,230,558 | 1/1966 | Duncan | 5/720 |
| 3,310,819 | * 3/1967 | Morrison | 5/718 X |
| 3,401,411 | * 9/1968 | Morrison | 5/718 X |

(List continued on next page.)

FOREIGN PATENT DOCUMENTS

| | | | |
|---|---|---|---|
| 1194621 | 10/1985 | (CA) . | |
| 3831510A1 | 5/1989 | (DE) . | |
| 4031652A1 | 4/1992 | (DE) . | |
| 0089789A1 | 9/1983 | (EP) . | |
| 0357912A1 | 3/1990 | (EP) . | |
| 04214196A1 | 4/1991 | (EP) . | |
| 348298 | 5/1931 | (GB) . | |
| 1289583 | * 9/1972 | (GB) | 5/716 |
| 2028645 | * 3/1980 | (GB) | 267/86 |
| 2143731 | 11/1986 | (GB) . | |
| 2198938 | * 6/1988 | (GB) | 5/716 |
| 8101008 | * 10/1982 | (NL) | 5/716 |

* cited by examiner

Primary Examiner—Terry Lee Melius
Assistant Examiner—Robert G. Santos
(74) Attorney, Agent, or Firm—Wood, Herron & Evans, LLP

(57) ABSTRACT

A pocketed coil spring assembly for use in the manufacture of mattresses or cushions or the like comprising a plurality of strips of integrally connected closed fabric pockets each containing one helically coiled wire compression spring having its axis disposed transversely of the strip, and wherein each of the strips contains a single band of interconnected springs formed from a single length of wire into a plurality of interconnected helical coil springs. The springs of the bands may contain inserts such as foam cylinders or pocketed coil springs to impart differing degrees of firmness to different strips. Adjacent coil springs may be separated by multiple transverse lines of attachment in order to posturize the product.

22 Claims, 6 Drawing Sheets

U.S. PATENT DOCUMENTS

| | | | | |
|---|---|---|---|---|
| 3,732,586 | * | 5/1973 | Frey | 5/718 |
| 4,052,760 | * | 10/1977 | Golembeck et al. | 5/248 |
| 4,161,046 | * | 7/1979 | Golembeck | 5/248 |
| 4,234,983 | | 11/1980 | Stumpf | 5/655.8 |
| 4,234,984 | | 11/1980 | Stumpf | 5/655.8 |
| 4,358,097 | | 11/1982 | Zapletal et al. | 267/101 |
| 4,451,946 | | 6/1984 | Stumpf | 5/655.8 |
| 4,523,344 | | 6/1985 | Stumpf et al. | 5/655.8 |
| 4,578,834 | | 4/1986 | Stumpf | 5/720 |
| 4,679,266 | * | 7/1987 | Kraft | 5/716 |
| 4,771,494 | * | 9/1988 | Zapletal et al. | 5/716 |
| 4,790,038 | * | 12/1988 | Ikeda | 267/91 X |
| 4,854,023 | * | 8/1989 | Stumpf | 5/720 X |
| 4,862,540 | * | 9/1989 | Savenije | 5/718 |
| 4,867,423 | * | 9/1989 | Marsh | 267/91 |
| 4,886,249 | | 12/1989 | Docker et al. | 267/91 |
| 4,905,333 | | 3/1990 | Scott | 5/716 |
| 4,907,309 | | 3/1990 | Breckle | 5/720 |
| 4,918,773 | * | 4/1990 | Scott | 5/727 X |
| 4,972,536 | * | 11/1990 | Scott | 5/716 |
| 4,986,518 | * | 1/1991 | Stumpf | 267/91 |
| 5,127,635 | | 7/1992 | Long et al. | 267/91 |
| 5,222,264 | * | 6/1993 | Morry | 5/716 X |
| 5,319,815 | | 6/1994 | Stumpf et al. | 5/720 |
| 5,438,718 | | 8/1995 | Kelly et al. | 5/720 |
| 5,572,853 | * | 11/1996 | St. Clair et al. | 53/440 |
| 5,649,332 | | 7/1997 | Wells et al. | 5/727 |
| 5,669,093 | | 9/1997 | Ogle et al. | 5/720 |
| 5,761,784 | | 6/1998 | Ogle et al. | 5/720 |
| 5,868,383 | * | 2/1999 | Codos | 267/91 X |
| 5,957,438 | * | 9/1999 | Workman et al. | 267/90 |
| 5,987,678 | * | 11/1999 | Ayers | 5/716 X |
| 6,036,181 | * | 3/2000 | Workman | 5/655.8 X |
| 6,085,397 | * | 7/2000 | Workman et al. | 5/655.8 X |
| 6,098,223 | * | 8/2000 | Larson | 5/716 |
| 6,098,968 | * | 8/2000 | Workman | 267/90 |

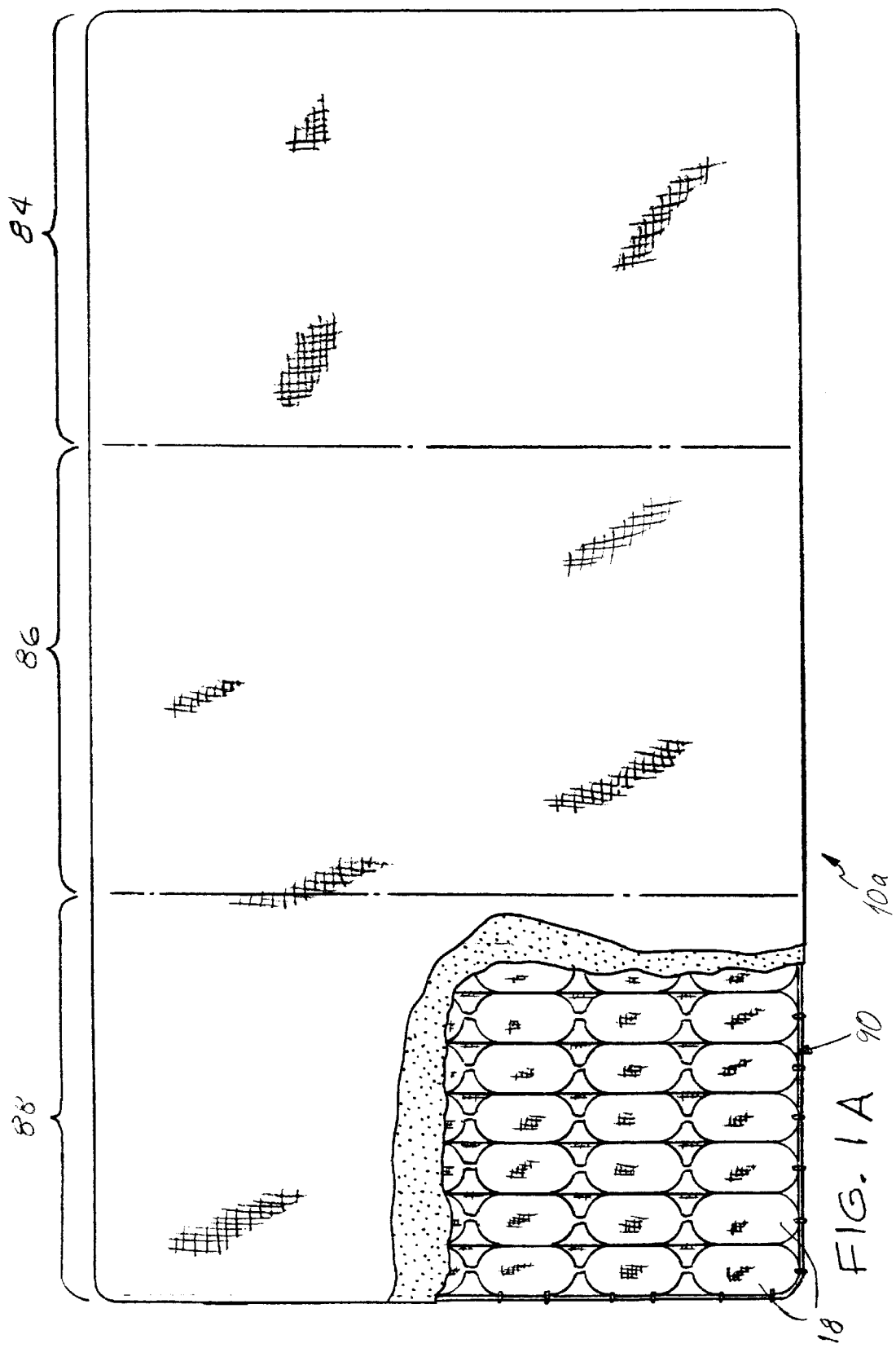

POCKETED BEDDING OR SEATING PRODUCT

CROSS REFERENCE TO RELATED APPLICATIONS

This patent application claims priority to U.S. provisional patent application Ser. No. 60/118,767 filed Feb. 5, 1999 entitled "Pocketed Bedding or Seating Product".

FIELD OF THE INVENTION

This invention relates to spring assemblies for mattresses, cushions and other bedding or seating products.

BACKGROUND OF THE INVENTION

A known form of spring assembly comprises a plurality of longitudinally extending bands of springs disposed side by side and connected together by helical wires which extend transversely of the bands and embrace portions of the bands. Several kinds of bands of springs have been proposed for incorporation in spring interiors. One kind of band, a so-called continuous band of springs, is disclosed in U.S. Pat. No. 4,358,097 assigned to the assignee of this application. Another kind of band is disclosed in British Patent No. 2,143,731. Both of the bands of springs disclosed in these two patents comprise a single length of spring wire shaped to form a plurality of individual coil springs arranged in a row, one end turn of each coil spring lying adjacent to a top face of the band, and the other end turn of each coil spring lying adjacent to a bottom face of the band. The coil springs of the band of springs disclosed in the above identified U.S. patent are all of the same rotational hand, while the coil springs of the above-identified British patent are of a rotational hand opposite to the rotational hand of the adjacent coils in the same row. The adjacent coils of the bands of springs disclosed in both patents are interconnected to adjacent coils by a pair of interconnecting segments of wire integral with the coil springs. One of the pair of interconnecting segments is located in the bottom face of the band, and the other of the pair of interconnecting segments is located in the top face of the band.

When bands of springs of the type described hereinabove are assembled to form a spring interior, they are conventionally disposed side by side and interconnected by helical lacing wires, some of which lie in the top face of the spring interior and others of which lie in the bottom face thereof, the top and bottom faces of the spring interior being the faces defined by the top and bottom faces of the bands incorporated in the spring interior. Each helical lacing wire extends across the bands of springs and embraces portions of wires of the bands that extend transversely of the bands.

The presence of helical lacing wires in such continuous band spring assemblies can give rise to production problems and limit applications of the product. For example, the application of the helical lacing wires to the assembly must be performed mechanically in order to be practical, and such mechanical assembly can give rise to production machinery jams and production work stoppages. Furthermore, helical lacing wires in such a spring assembly can create undesirable noise and be a weak point in the assembly if the helical lacing wires are overstressed, bent, and caused to fracture. Furthermore, this assembly technique either requires that the bands of springs be assembled side by side in order to prevent voids between adjacent rows of coil springs, or, if the rows are spaced, results in holes or voids into which padding may fall and ultimately impair the appearance and comfort of the resulting product.

A known alternative to using helical lacing wires to connect individual rows of continuous bands of coil springs together is to place each band between two plies of fabric and join the plies in order to form blocks, strips or tubes. The blocks or tubes are then joined together in order to create a coil spring assembly. Adjacent blocks may be joined together with glue, ultrasonic welds or other media without requiring the use of helical lacing wires. Applicants' U.S. Pat. No. 5,127,635, which is fully incorporated herein, discloses such a coil spring assembly. Additionally, applicants' U.S. Pat. No. 5,669,093, which is fully incorporated herein, discloses a coil spring assembly in which the blocks, each containing a continuous band of coil springs, are integrally joined by joining the two plies of fabric defining the blocks in alternative planes. The method of constructing such a coil spring assembly is disclosed in applicants' U.S. Pat. No. 5,761,784, which is fully incorporated herein.

The coil spring product disclosed in U.S. Pat. No. 5,127,635 comprises a plurality of individual pockets formed within each strip or block by joining the opposed plies of fabric in transversely extending lines of attachment. However, each pocket within a block contains two adjacent coil springs which upon being compressed when subject to a load may contact one another, creating clicking sounds, or what is generally considered in the industry as "noise." Oftentimes, it is desirable to posturize a mattress or other bedding or seating product by making one section of the bedding or seating product firmer than another section. Numerous patents have disclosed multiple different ways of posturizing a bedding or seating product. In a pocketed bedding or seating product in which continuous bands of coil springs are located within fabric blocks or strips, one known method of posturizing such a bedding or seating pocketed product is to make the continuous bands of coil springs of different gauge wires. Select blocks contain bands of coil springs of a differing gauge wire than the bands contained in other blocks in order to posturize the bedding or seating product. Because the assembly of such a bedding or seating product requires bands of wire of at two different gages, the assembly of such a product is time-consuming and labor-intensive. Additionally, the resulting product is expensive.

Therefore, it has been one objective of this invention to provide an improved continuous band spring assembly which eliminates the presence of the helical lacing wires and/or any other wire product for interconnecting the adjacent bands of coil springs.

Another objective of this invention has been to provide an improved continuous band spring product which is quieter than prior art continuous band products because of the absence of helical lacing wires and the absence of any potential for coil springs of one band to rub against coil springs of adjacent bands or coil springs of the same band and thereby give rise to noise.

Still another objective of the present invention has been to provide a pocketed coil spring product which may be easily posturized without using continuous bands of coil springs of differing gauge wire.

SUMMARY OF THE INVENTION

The pocketed bedding or seating product of the present invention which accomplishes these objectives comprises a plurality of parallel fabric strips joined to each other using conventional methods such as gluing, ultrasonic welding, or using conventional fasteners such as hog rings. The assembly of parallel fabric strips may then be joined to upper and lower generally rectangular border wires located in the top and bottom planes of the bedding or seating product. Each fabric strip contains a continuous band of coil springs formed from a single length of wire formed into a plurality of parallel coil springs arranged in a row and connected by interconnecting segments of wire located alternatively in top and bottom faces of the band. Each of the coil springs has an upper end turn, a lower end turn and a plurality of central convolutions located between the end turns and defining an axis of the coil spring.

Each band of springs is contained within a longitudinally extending strip or block of integrally connected closed fabric pockets, each pocket of which contains one helically coiled wire compression spring having its axis disposed transversely of the strip and wherein the pockets are defined between two overlapped plies of fabric strip by spaced transverse lines of attachment of the plies to one another and by connection of the plies together along spaced longitudinal lines. Each of the transverse lines of attachment except the endmost transverse lines of attachment is of a length less than the height of the block or strip so that the welding heads or other apparatus which form the lines of attachment do not contact the interconnecting segments of the continuous bands of springs during the manufacturing process. In one preferred embodiment of the present invention, the interior transverse lines of attachment are of a length approximately three-quarters of the height of the block and extend, alternatively, downwardly from the top surface of the block and upwardly from the bottom surface of the block. In a second preferred embodiment the interior transverse lines of attachment are located approximately halfway up the height of the block and have a length equal to or less than one-quarter of the height of the block. The endmost transverse lines of attachment of each strip are preferably of a length equal to the height of the block or strip and function to close the ends of the strip.

The bedding or seating product of the present invention may be posturized by inserting inserts such as, for example, urethane foam cylinders or individually pocketed springs inside the central convolutions of the coil springs of select bands of coil springs. If foam cylinders are used they may be made from any of numerous foam products known in the art. The inserts located within the coil springs of a continuous band of coil springs located within a fabric strip are preferably all identical in order to provide a uniform degree of firmness within the strip. For example, if foam cylinders are used as inserts, the foam cylinders located within a fabric strip are preferably of the same density or firmness. Similarly, if individually pocketed springs are used as inserts inside the coil springs of a band of springs, the individually pocketed springs preferably have identical characteristics such as the same gauge wire and the same height within a fabric strip. However, different strips may be of differing firmnesses due to the inserts inside the strips, such as foam cylinders of differing densities or individually pocketed springs of differing characteristics. Strips of differing firmnesses may be joined together in a desired pattern or orientation to create a posturized product in which select portions of the product are firmer than other portions. For example, in order to make a mattress in which the middle third of the mattress is firmer than the end thirds of the mattress, inserts such as foam cylinders or individually pocketed springs may be inserted into the coil springs of the continuous bands of springs located inside the transversely extending strips in the middle third of the mattress. The transversely extending strips contained in the endmost thirds of the mattress would either have no inserts or inserts of a lesser firmness than the inserts used for the middle third of the mattress.

In accordance with the present invention a pocketed bedding or seating product may be posturized without the use of inserts. Such a bedding or seating product may be made up of multiple uniform strips. Alternatively, the bedding or seating product may comprise multiple different strips comprising portions of differing firmnesses. In order to make one portion of a bedding or seating product less firm or "softer" than another portion of the bedding or seating product, the "softer" portion may comprise strips in which multiple transverse lines of attachment are located between adjacent coil springs of a band of springs within the strips. In one or more portions of a strip multiple, spaced transverse lines of attachment may be sewn, glued or other inserted between adjacent coil springs which increases the softness of that particular portion of the strip. Additionally, select strips may be constructed "softer" than other strips, the "softer" strips having a pair of spaced transverse lines of attachment between adjacent coil springs as opposed to only one transverse line of attachment between adjacent coil springs within the strip.

One advantage of the pocketed continuous band spring assembly manufactured in accordance with this invention is that it provides a very quiet spring assembly and one which is relatively easy to manufacture on automated production equipment without the potential for jams and production breakdowns. Yet another advantage of the pocketed continuous band spring assembly of this invention is that it prevents "shingling" or catching of one turn of a coil spring in the turn of an adjacent coil of the same band or adjacent band of coil springs. Once caught in the turn of an adjacent coil, the coil may not return to its original height and may create an unsightly blemish in the top surface of the resulting spring product assembly. Another advantage of the pocketed spring product of the present invention is that the product may be easily posturized so that the firmness of the spring assembly may be easily varied from one section or portion of the spring assembly to another.

These and other objects and advantages of the invention will be more readily apparent from following description of the drawings in which:

BRIEF DESCRIPTION OF THE DRAWINGS

FIG. 1A is a top plan view, partially broken away, of a posturized bedding product with transversely extending strips.

DETAILED DESCRIPTION OF THE DRAWINGS

Figure 1:
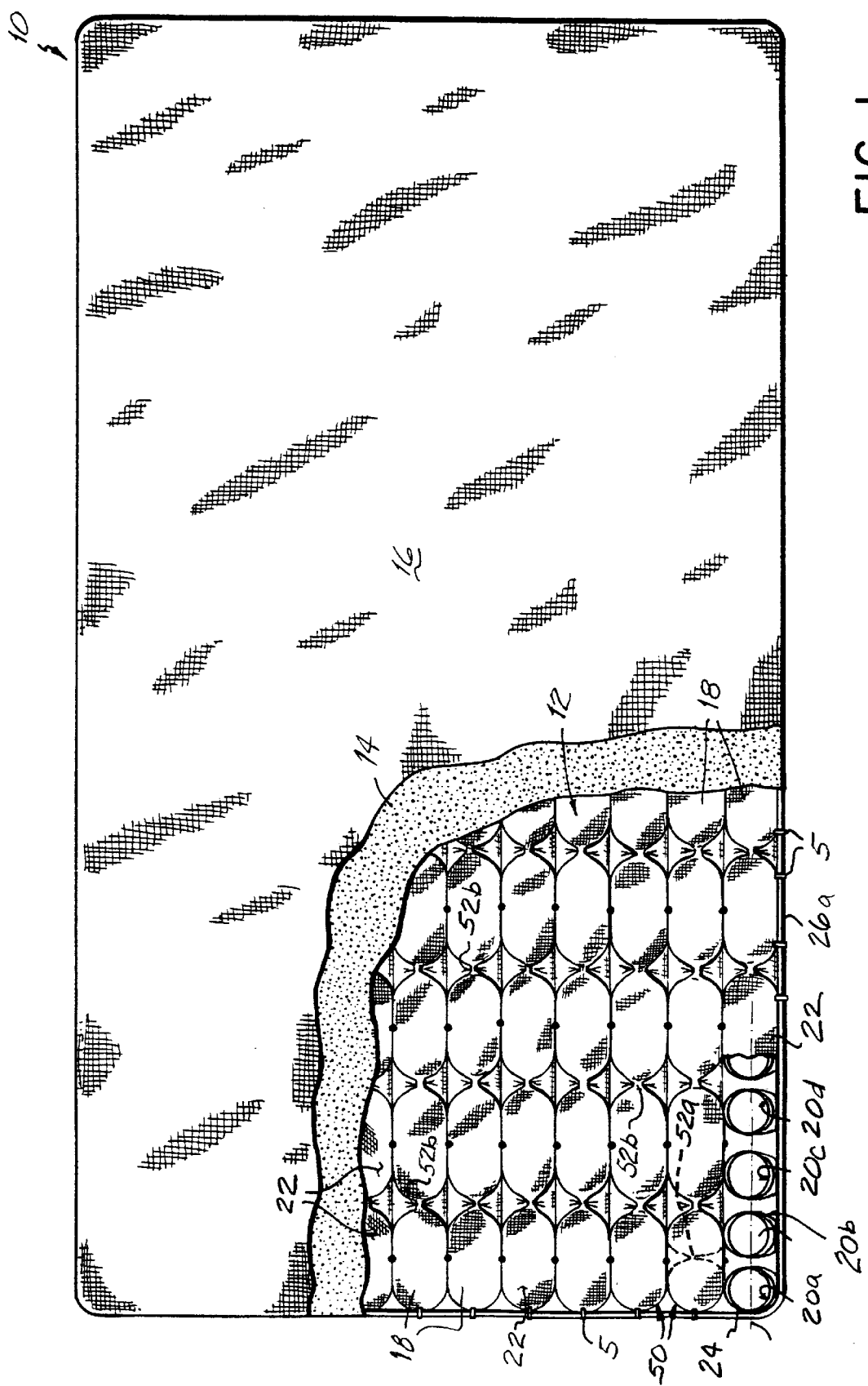
FIG. 1 is a top plan view, partially broken away, of a spring assembly embodying the invention of this application.
Figure 2:
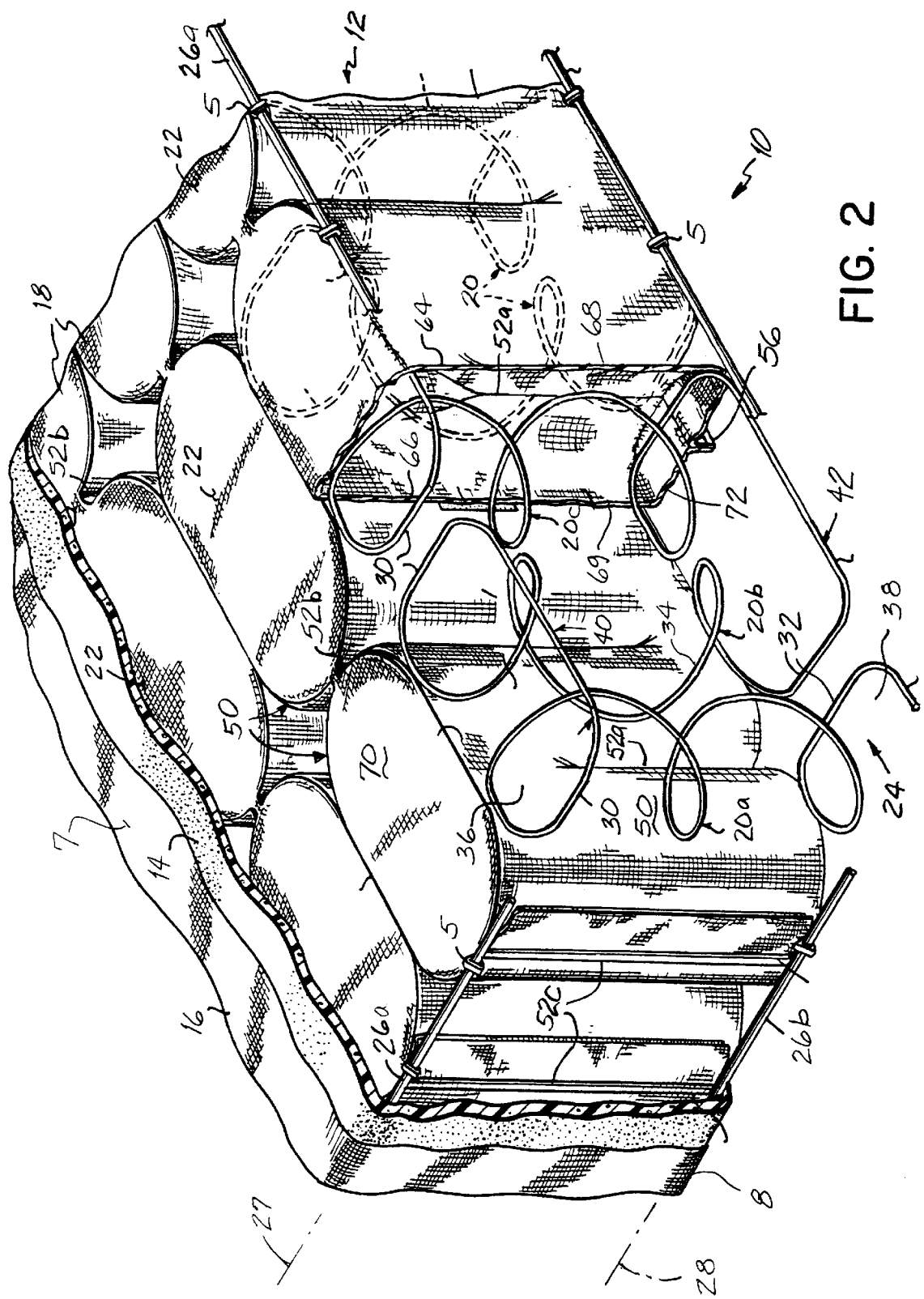
FIG. 2 is a perspective view, partially broken away, of one corner of the spring assembly of FIG. 1.

With reference first to FIGS. 1 and 2, there is illustrated a mattress 10 embodying the invention of this application. Although a mattress is illustrated, the present invention may be used to construct any bedding or seating product. This mattress 10 comprises a spring interior or pocketed spring assembly 12 on the top and bottom surfaces of which there is a covering pad 14. An upholstered covering 16 encases the spring interior 12 and the covering pad 14. Additional layers of padding may be added if desired.

The spring interior 12 is formed from a plurality of strips or blocks 18 of pocketed coil springs 20. Each strip 18 of pocketed coil springs 20 comprises a fabric covering 22 within which there is located a band 24 of coil springs 20. Although FIG. 1 illustrates these strips 18 extending longitudinally of the mattress 10, the strips 18 may extend transversely of the mattress as well (from side to side) as illustrated in FIG. 1A. The strips 18 are secured to top and bottom border wires 26a,b by conventional hog rings 5 but may be secured to the border wires with any other type of fasteners. As illustrated in FIG. 2, the mattress has a top surface 7 defining a top plane 27 and a bottom surface 8 defining a bottom plane 28. The border wires 26a,b are located in the top and bottom planes 27,28, respectively, of the mattress and extend completely around the periphery of the spring interior 12.

Each strip 18 contains a continuous band 24 of coil springs 20. Each band 24 of coil springs 20, a portion of only one of which is illustrated in FIGS. 1 and 2, is made from a single length of spring wire shaped to form a plurality of individual coil springs 20 arranged in a row. Each band 24 extends for the full length of the strip or block 18 and has a top face 36 and a bottom face 38. Each coil spring 20 comprises about 2½ turns of wire with an axis which extends vertically perpendicular to the top and bottom faces of the band of coil springs 20 and the spring interior. Each coil spring 20 has an upper end turn 30, a lower end turn 32 and a plurality of central convolutions 34 between the end turns. The end turns 30,32 of the coil springs 20 lie adjacent to the top and bottom faces 36,38 of the band. Each coil spring 20 is so coiled as to have a rotational hand or direction of rotation opposite to the rotational hand of the adjacent coil springs of the same band. Each coil spring 20 is joined to the next adjacent coil springs 20 by two interconnecting segments 40,42 of the wire integral with the coil springs. One of the two interconnecting segments 40,42 is in the top face 36 of the band 24, and the other is in the bottom face 38 thereof. For example, coil spring 20a is connected to coil spring 20b by interconnecting segment 40 which is in the top face 36 of the band, and the coil spring 20b is connected to coil spring 20c by interconnecting segment 42 which is in the bottom face 38 of the band. See FIGS. 1 and 2.

Figure 5:
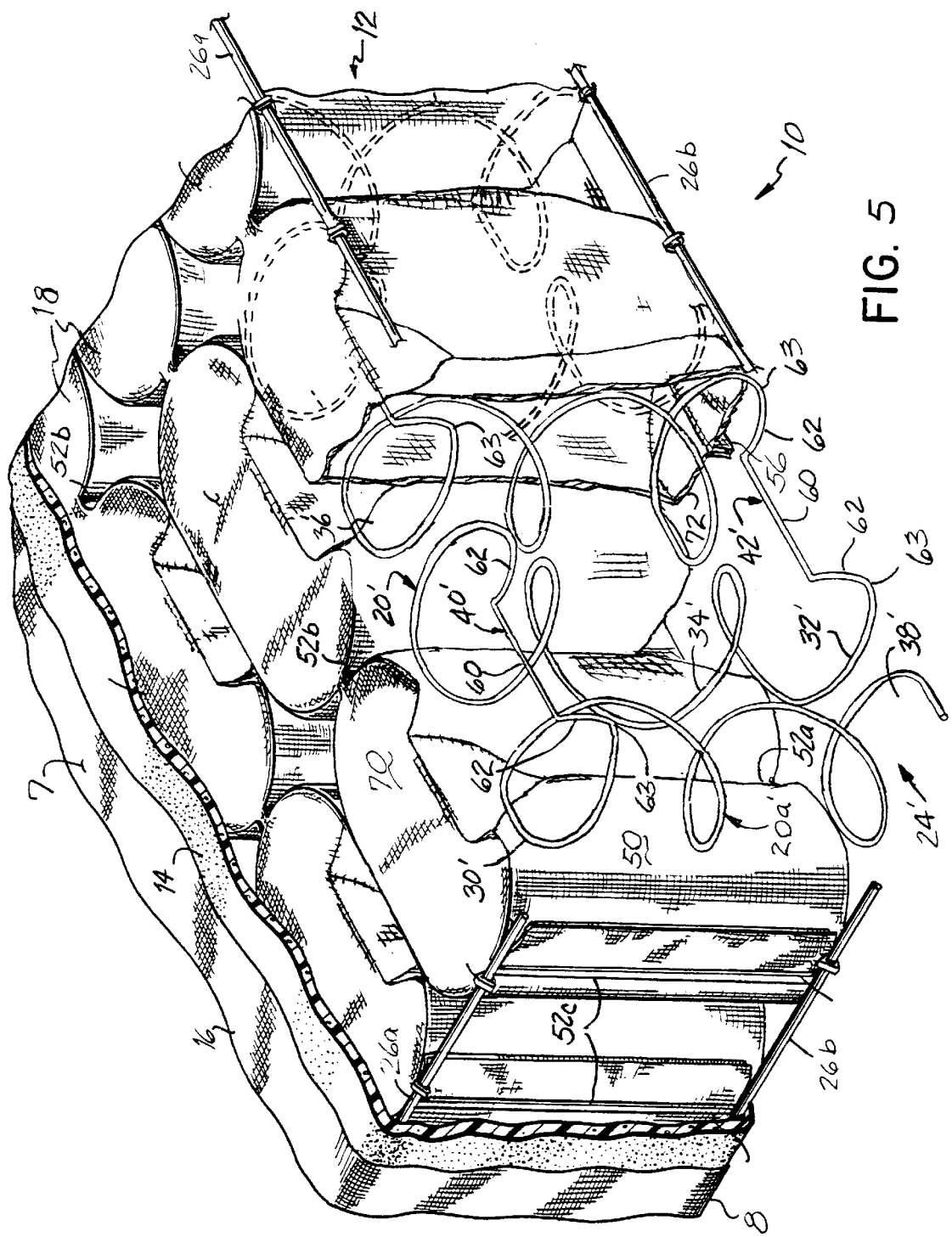
FIG. 5 is a perspective view, partially broken away, of a corner of a pocketed spring assembly in which the strips contain an alternative embodiment of continuous band of coil springs which may be used in accordance with the present invention.

FIG. 5 illustrates an alternative embodiment of continuous band 24' of coil springs 20' which may be used in accordance with the present invention. For the sake of simplicity the numbers used to identify the parts of this embodiment are the same numbers used for the embodiment of continuous band 24 of FIGS. 1 and 2 but with a prime after the number. The 20 band 24' comprises a plurality of coil springs 20' arranged in a row. Each coil spring 20' has an upper end turn 30' located generally in the top face 36' of the band, a lower end turn 32' located in a bottom face 38' of the band, and a plurality of central convolutions 34'. Each coil spring 20' except for the endmost coil springs (only one 20a' being shown in FIG. 5) is joined to the adjacent coil springs by two interconnecting segments 40' and 42' of the wire integral with the coil springs 20'. The interconnecting segments 40',42' differ in configuration from the interconnecting segments 40,42 of the band of coil springs 24 illustrated in FIG. 2. Each interconnecting segment 40',42' has a linear segment 60 and two opposed end segments 62 located on opposite sides of the linear segments 60. Each end segment 62 joins one end of the linear segment 60 to one of the end turns 30', 32' of one of the coil springs 20' at a location 63.

Although two different configurations of interconnecting segments of continuous bands of coil springs have been illustrated and described in this application, numerous other configurations of inter-connecting segments such as those disclosed in U.S. Pat. No. 5,649,332 assigned to the assignee of this application or U.S. Pat. No. 5,127,635 assigned to the assignee of this application may be used as well. This application does not intend to limit the configuration of interconnecting segments or any other portion of the continuous band of coil springs used in accordance with the present invention.

In accordance with the invention of this application, each band 24 of coil springs 20 is encased within a folded two-ply strip of nonwoven 20 fabric containing thermoplastic fibers in which the individual spring pockets 50 are defined between the plies by transverse lines of attachment 52a,b,c of discrete thermal welds of the plies to one another and in which the pockets 50 are further defined by at least one longitudinal seam or line of attachment 56 of a similar thermal weld. As an alternative to the use of thermal welds, the longitudinal seams 56 which extend for the length of the strips or blocks 18 and the transverse thermal welds 52 which extend for less than the full height or transverse dimension of the strips (except for the endmost transverse thermal welds) may be replaced by sewn seams or by ultrasonic welding of the seams or even by adhering the two plies together to form the pockets. Of course, the particular fabric chosen for each of these different seam forming techniques would be determined by the nature of the seam to be employed to form the pockets. For example, if the pockets are to be sewn, a cotton fabric or a cotton blended fabric or any polyolefin-type fabric could be employed. Alternatively, if the seams are to be formed by ultrasonic welding of the two plies of fabric, the fabric must contain fibers which melt and become thermoplastic in response to the application of ultrasonic welding techniques.

Figure 7:
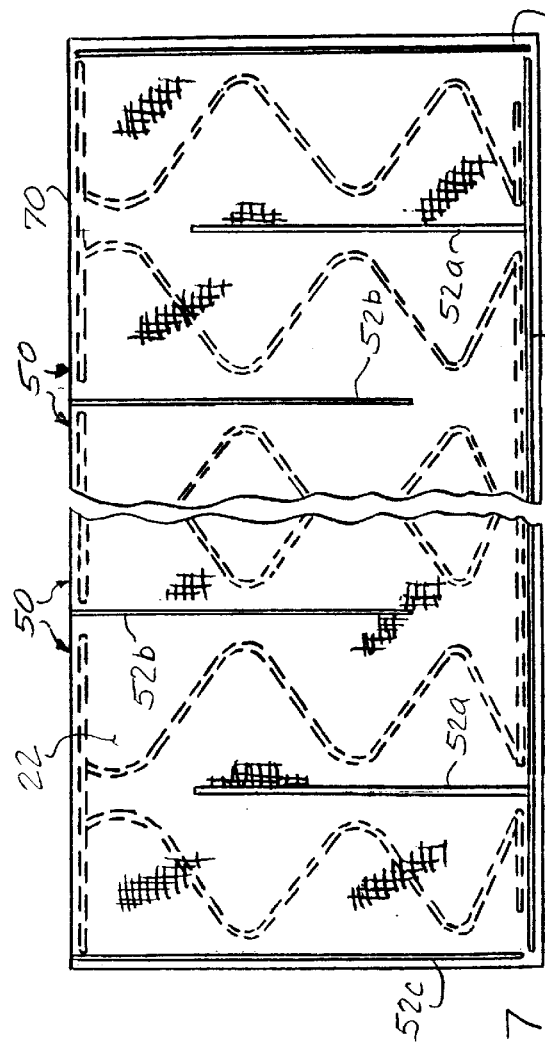
FIG. 7 is a fragmentary side elevational view of one of the strips of the spring assembly of FIG. 2.

One coil spring 20 is located within each individual pocket 50, each pocket 50 being defined by at least one longitudinally extending line of attachment 56 and a pair of adjacent transverse lines of attachment 52. In the embodiments illustrated in FIGS. 2 and 5, except for the outermost or endmost lines of attachment 52c, every other transverse line of attachment 52a extends upwardly from a longitudinal line of attachment 56 of strip 18. Similarly, every other transverse line of attachment 52b extends downwardly from an upper or top surface 70 of the fabric strip 18. As best illustrated in FIG. 7, in this embodiment of the present invention, each of the transverse lines of attachment 52a, 52b, except for the outermost ones, does not extend vertically for the full height of the fabric strip 18 but rather extends upwardly or downwardly, respectively, approximately three-quarters of the height of the strip. Thus, each of the individual pockets 50 in which only one coil spring 20 is located are not entirely closed. The only transverse lines of attachment which do extend for the full height of the strip 18 are the endmost lines of attachment 52c (only one being shown in FIGS. 2 and 5) within each fabric strip 18. These endmost transverse lines of attachment 52c hold the outermost coil springs 20 within the fabric strips 18.

In order to assemble a pocketed bedding or seating product in accordance with the present invention, a plurality of individual strips 18 must be completed before the strips 18 may be joined together in order to create the bedding or seating product. Once a continuous band 24 of coil springs 20 in accordance with the present invention has been manufactured, the continuous band 24 of coil springs 20 is held stationary in a tray or other holding mechanism. A sheet of fabric is then wrapped around the band and opposite edges of the sheet joined together with a longitudinally extending line of attachment 56, as best illustrated in FIGS. 2 and 5. The longitudinal line of attachment 56 is illustrated as extending along the lower surface of the strip 18 but may be located along the upper surface of the strip 18 or elsewhere. The length or sheet of fabric, once wrapped around the band 24 of continuous coil springs, defines two opposite plies 64 and 66, located on opposite sides of the band 24 of coil springs. The outer surfaces of these plies 64,66 comprise side portions 68,69 of the strip 18. Additionally, due to the generally planar nature of the top and bottom faces 36,38 of the band 24 of coil springs, the strip 18 has a generally planar top surface 70 and a generally planar bottom surface 72, the distance between the top and bottom surfaces of the strip defining the height of the strip. As illustrated, the longitudinal line of attachment 56 extends along the length of the bottom surface 72 of the strip 18. The endmost edges of the length of fabric are then sewn, welded or otherwise secured together, creating endmost transverse lines of attachment 52c in order to complete the strip 18. Lastly, the interior transverse lines of attachment 52a,52b are then made by joining the plies 64 and 66 together. Any of the lines of attachment described hereinabove may alternatively constitute dashed lines rather than continuous linear lines.

After the rows or strips of pocketed coil springs are secured together by securement of the side surfaces 68, 69 of adjacent strips and a sufficient number of those strips have been adhered together to extend for the full width or length of a bedding or seating product, the spring interior 12 is completed by securement of the border wires 26a, 26b on the top and bottom edges of the spring interior 12. Thereafter, the bedding or seating product is completed by placement of the pads 14 over the top and bottom surfaces of the spring interior 12, and the complete spring interior, including the pads, are encased within conventional ticking or upholstered covering material 16.

Figure 3:
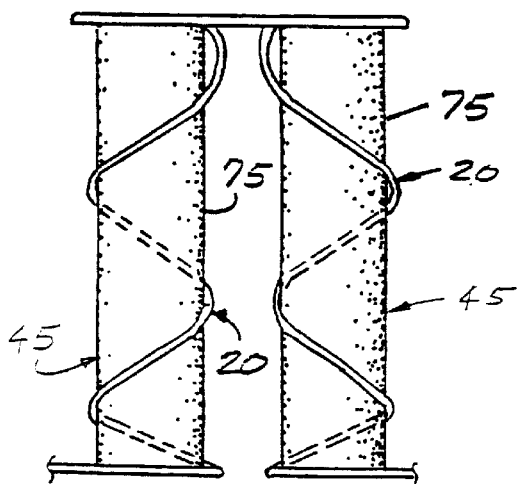
FIG. 3 is a fragmentary side elevational view of a portion of one of the continuous bands of coil springs of the present invention with foam cylinders located inside the coil springs of the continuous band.

Referring to FIG. 3, the bedding or seating product of the present invention may be posturized or customized in such a way so that select portions of the bedding or seating product are firmer than other portions of the bedding or seating product. One way in which this may be accomplished in accordance with the present invention is to insert a foam cylinder 75 inside each of the coil springs 20 within a band 24. The foam cylinders 75 within each band 24 are preferably of the same firmness so that the strip 18 containing the band 24 has a uniform firmness along its entire length. In select portions of a bedding or seating product in which increased firmness is desired, foam cylinders 75 may be inserted inside the coil springs 20 of the bands 24 inside the strips 18 comprising that particular portion of the bedding or seating product. Other portions of the bedding or seating product in which a lesser degree of firmness is desired may comprise strips 18 containing foam cylinder inserts of a lesser density, or omit the foam cylinders altogether.

Figure 4:
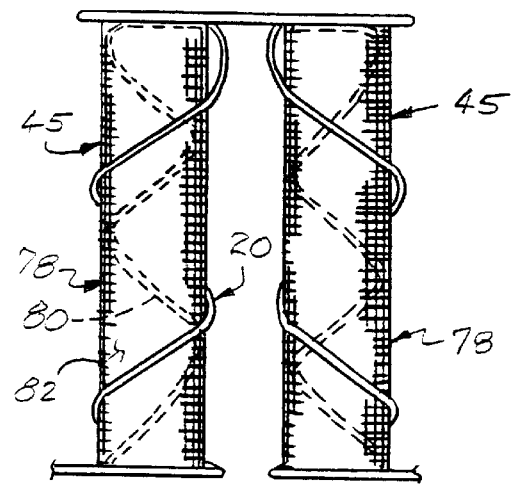
FIG. 4 is a fragmentary side elevational view of a portion of one of the continuous bands of coil springs of the present invention with pocketed coil springs located inside the coil springs of the continuous band.

Referring to FIG. 4, another type of insert 45 which may be located inside the central convolutions of the coil springs of any particular band of springs located within any particular strip 18 is a pocketed coil spring assembly 78. The pocketed coil spring assembly 78 comprises its own interior coil spring 80 surrounded and encased by a fabric covering 82 which is entirely closed and functions to maintain the coil spring 80 in a partially compressed condition. Like the foam cylinders 75 illustrated in FIG. 20 3, the pocketed coil spring assemblies 78 within each strip 18 are preferably identical so as to impart the same degree of firmness throughout the length of the strip 18.

As illustrated in FIG. 1A, a mattress or any other bedding or seating product 10a may be divided into separate portions or areas of differing firmnesses in order to posturize the bedding or seating product.

For example, as illustrated in FIG. 1A from left to right, a mattress may be divided into three separate sections or portions: a head portion 84, a seat portion 86 and a foot portion 88. The transversely extending strips 18 comprising the spring interior of the mattress, as illustrated in FIG. 1A, are thus divided into three groups, only the group of strips 90 located in the foot portion 88 of the mattress being illustrated. The strips within each portion of the mattress are preferably identical so as to impart a uniform firmness throughout that particular portion of the mattress. However, it is within the purview of this application to have portions of a bedding or seating product contain strips having different degrees of firmness due to different inserts, different gauge wire bands or other characteristics.

It may be desirable to posturize the bedding or seating product 10a by making one portion firmer than the other portions. For example, the seat portion 86 of a mattress may be made firmer than the head and foot portions 84,88 by inserting inserts such as foam cylinders 78 or pocketed coil spring assemblies 78 inside the coil springs contained inside the strips making up the seat portion 86 of the mattress. The strips making up the head and foot portions 84, 88 of the mattress 10 would either lack inserts inside the coil springs of the bands of these strips or contain inserts of a lesser firmness than the inserts contained within the strips of the seat portion 86 of the mattress. If pocketed coil spring assemblies 78 are used as inserts, they may impart differing degrees of firmness to the coil springs in which they are located depending upon the gauge wire of the coil springs 80 and the degree of compression of the coil springs 80. Similarly, if foam cylinders 75 are used as inserts, the foam inserts 75 may impart differing degrees of firmness to the coil springs in which they are located depending upon the density of the foam inserts 75. For example, the foam inserts 75 inside the strips 18 (as seen in FIG. 3) in the seat portion 86 of the mattress of FIG. 1A may be of an increased density relative to the density of the foam inserts 75 of the strips of the head and foot portions 84, 88 of the mattress.

Figure 6:
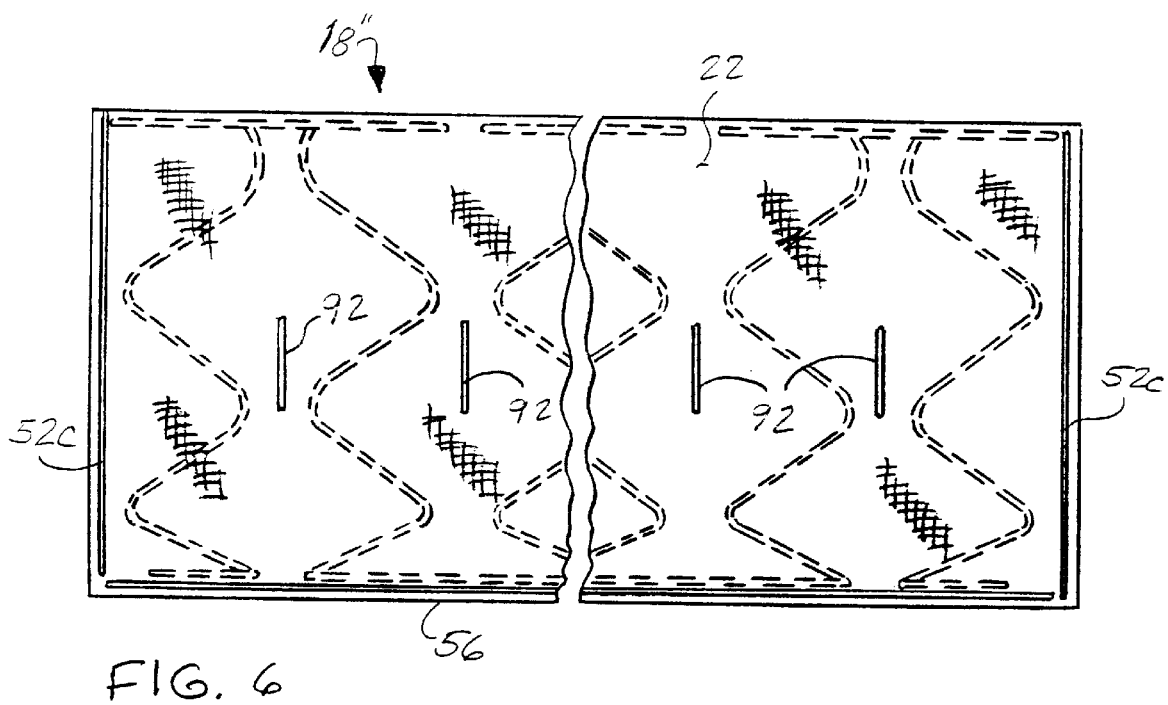
FIG. 6 is a fragmentary side elevational view of an alternative embodiment of strip of the present invention for use in bedding or seating products.

FIG. 6 illustrates an alternative preferred embodiment of strip 18" made in accordance with the present invention. In this embodiment of strip 18", the interior transverse lines of attachment 92 are not three quarters of the length of the height of the strip as they are in the embodiments of FIGS. 2 and 5. In this embodiment of strip 18", the interior transverse lines of attachment 92 are centrally located and of a length less than or equal to approximately one-quarter of the height of the strips 18". Such short interior lines of attachment of the opposed plies (not shown in FIG. 6) to each other lessen the time required to manufacture of the strip.

Figure 8:
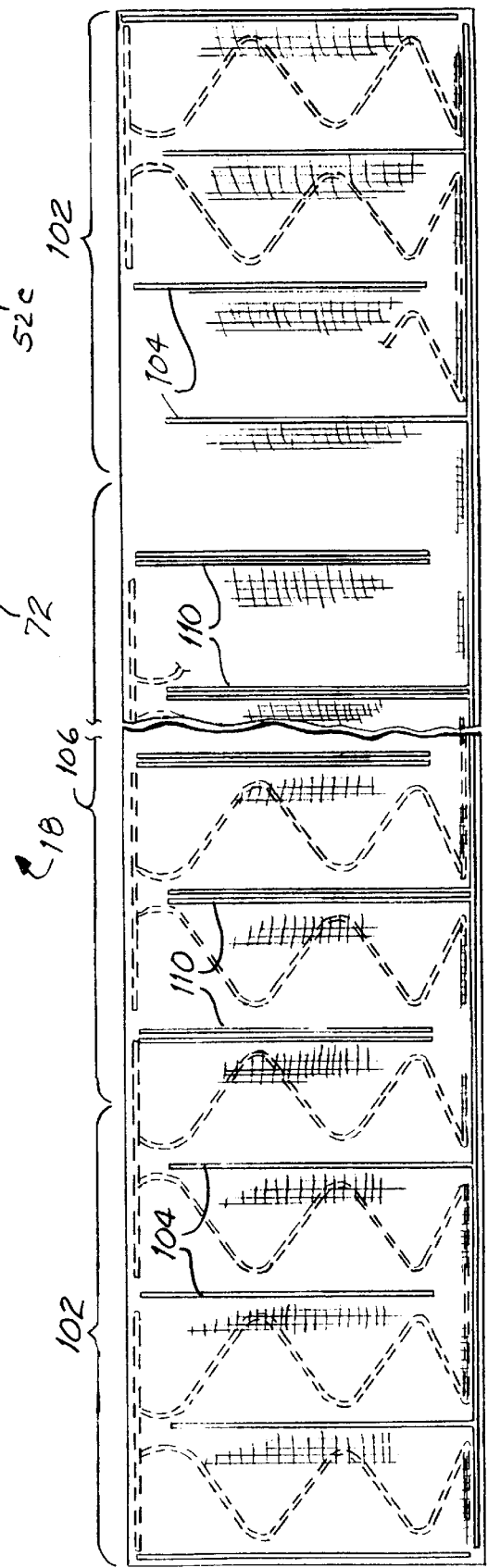
FIG. 8 is a fragmentary side elevational view of an alternative embodiment of strip of the present invention for use in bedding or seating products.

FIG. 8 illustrates an alternative preferred embodiment of strip 18''' made in accordance with the present invention. In this embodiment of strip 18''', one or more interior transverse lines of attachment exist between adjacent coil springs. As illustrated in FIG. 8, in outermost portions 102 of the strip 18''' only one interior transverse line of attachment 104 exists between adjacent coil springs. In a middle portion 106 of the strip 18''' pairs of interior transverse lines of attachment 110 exist between adjacent coil springs. The effect of such a construction is that the middle portion 106 of the strip is less firm or "softer" than the outermost portions 102 of the strip because of the extra material located between each pair of interior transverse lines of attachment 110. The more space between the individual transverse lines of attachment 110 of a pair, the softer that particular portion of the strip. A bedding or seating product made up of a plurality of strips so constructed will have a pair of opposed side portions and a middle portion located between the opposed side portions, the middle portion being "softer" or less firm than the opposed side portions due to the double transverse lines of attachment 110 between adjacent coil springs in the middle portion of the strip.

Alternatively, strips made in accordance with the present invention may have pairs of transverse lines of attachment, as opposed to just one transverse line of attachment, between all adjacent coil springs of the strip. Strips so constructed are "softer" or less firm than strips in which only one transverse line of attachment separates adjacent coil springs. Therefore, a bedding or seating product may be posturized (one portion made firmer than another portion) by using a combination of different strips. For example, a seating product may be constructed so that the rear portion of the seating product is firmer than the front portion of the seating product because the rear portion comprises a plurality of strips in which only one transverse line of attachment exists between adjacent coil springs of the strips and the front portion of the seating product comprises a plurality of strips in which pairs of transverse lines of attachment exist between adjacent coil springs.

Other changes such as transverse lines of attachment of differing lengths may be part of the strips without departing from the spirit of the invention of this application. Therefore, we do not intend to be limited except by the scope of the following appended claims:

We claim:

1. A bedding or seating product comprising:
 a pocketed spring assembly comprising plurality of parallel, fabric strips joined to each other, each of said fabric strips having an upper surface and a lower surface and containing a continuous band of coil springs, said band of coil springs being formed from a single length of wire formed into a plurality of parallel coil springs, each of said coil springs having an upper end turn, a lower end turn and a plurality of central convolutions between said end turns, said central convolutions defining an axis of said coil spring, said coil springs of said band being arranged in a row and interconnected by interconnecting segments of wire located alternatively in top and bottom faces of the band, said fabric strip being divided into a plurality of pockets by spaced transverse lines of attachment including a pair of outermost transverse lines of attachment, each pocket containing a single coil spring, each of said transverse lines of attachment between said outermost transverse lines of attachment extending alternatively upwardly from said lower surface of said strip and downwardly from said upper surface of said strip,
 a covering pad overlying said pocketed spring assembly; and
 an upholstered covering encasing said covering pad and said pocketed spring assembly.

2. A bedding or seating product comprising:
 a pocketed spring assembly comprising plurality of parallel, fabric strips joined to each other, each of said fabric strips having an upper surface and a lower surface and containing a continuous band of coil springs, said band of coil springs being formed from a single length of wire formed into a plurality of parallel coil springs, each of said coil springs having an upper end turn, a lower end turn and a plurality of central convolutions between said end turns, said central convolutions defining an axis of said coil spring, said coil springs of said band being arranged in a row and interconnected by interconnecting segments of wire located alternatively in top and bottom faces of the band, said fabric strip being divided into a plurality of pockets by spaced transverse lines of attachment including a pair of outermost transverse lines of attachment, each pocket containing a single coil spring, each of said transverse lines of attachment between said outermost transverse lines of attachment extending alternatively upwardly from said lower surface of said strip and downwardly from said upper surface of said strip.

3. The bedding or seating product of claim 2 wherein within select strips each of said coil springs of said band of springs has an insert located inside said central convolutions of said coil spring between said upper and lower end turns.

4. The bedding or seating product of claim 2 wherein each interconnecting segment of said band of springs comprises a linear segment and a pair of end segments, each end segment joining one end of said linear segment to one of said end turns of one of said coil springs.

5. The bedding or seating product of claim 2 wherein within select strips each of said coil springs of said band of springs has an insert located inside said central convolutions of said coil spring between said upper and lower end turns.

6. The bedding or seating product of claim 2 wherein a first group of said fabric strips have a greater firmness than a second group of said fabric strips due to inserts located inside said central convolutions of said coil springs of the bands of said first group of fabric strips.

7. The bedding or seating product of claim 6 wherein said inserts are foam cylinders.

8. The bedding or seating product of claim 6, wherein said inserts are foam cylinders.

9. The bedding or seating product of claim 2 wherein select pockets are separated from adjacent pockets by at least one transverse line of attachment.

10. The bedding or seating product of claim 2 wherein at least one group of said strips within said bedding or seating product has pockets separated from adjacent pockets by pairs of transverse lines of attachment.

11. A bedding or seating product comprising:
 a pocketed spring assembly comprising plurality of parallel, fabric strips joined to each other, each of said fabric strips having a fixed height and containing a continuous band of coil springs, said band of coil springs being formed from a single length of wire formed into a plurality of parallel coil springs, each of said coil springs having an upper end turn, a lower end turn and a plurality of central convolutions between said end turns, said central convolutions defining an axis of said coil spring, said coil springs of said band being arranged in a row and interconnected by interconnecting segments of wire located alternatively in top and bottom faces of the band, said fabric strip being divided into a plurality of pockets by spaced transverse lines of attachment, each pocket containing a single coil spring wherein foam cylinders inside select strips have a different density than foam cylinders inside other strips of the bedding or seating product in order to posturize the product.

12. A bedding or seating product comprising:

a pocketed spring assembly comprising plurality of parallel, fabric strips joined to each other, each of said fabric strips containing a continuous band of coil springs, said band of coil springs being formed from a single length of wire formed into a plurality of parallel coil springs, each of said coil springs having an upper end turn, a lower end turn and a plurality of central convolutions between said end turns defining an axis of said coil spring, said coil springs of said band being arranged in a row and interconnected by interconnecting segments of wire located alternatively in top and bottom faces of the band, said fabric strip being defined by wrapping a strip of fabric around said continuous band of coil springs and securing opposite edges of said strip together with a longitudinal line of attachment, said strip being divided into a plurality of pockets by a pair of outermost transverse lines of attachment and a plurality of spaced interior transverse lines of attachment, each pocket containing a single coil spring, said outermost transverse lines of attachment extending the full height of said strip and said interior transverse lines of attachment extending less than the full height of said strip wherein said interior transverse lines of attachment comprise alternatively lines of attachment extending away from said longitudinal line of attachment and transverse lines of attachment extending toward said longitudinal line of attachment.

13. The bedding or seating product of claim 12 wherein within select strips each of said coil springs of said band of springs has a foam cylinder located inside said central convolutions of said coil spring between said upper and lower end turns.

14. The bedding or seating product of claim 12 wherein each interconnecting segment of said band of springs comprises a linear segment and a pair of end segments.

15. The bedding or seating product of claim 12 wherein each of said coil springs of said band of springs has a pocketed spring located inside said central convolutions of said coil spring between said upper and lower end turns.

16. The bedding or seating product of claim 15 wherein the pocketed springs inside select strips are made of a different gauge wire than the pocketed springs inside other strips of the bedding or seating product in order to posturize the product.

17. A bedding or seating product comprising:

a pocketed spring assembly comprising plurality of parallel, fabric strips joined to each other, each of said fabric strips containing a continuous band of coil springs, said band of coil springs being formed from a single length of wire formed into a plurality of parallel coil springs, each of said coil springs having an upper end turn, a lower end turn and a plurality of central convolutions between said end turns defining an axis of said coil spring, said coil springs of said band being arranged in a row and interconnected by interconnecting segments of wire located alternatively in top and bottom faces of the band, said fabric strip being defined by wrapping a strip of fabric around said continuous band of coil springs and securing opposite edges of said strip together with a longitudinal line of attachment, said strip being divided into a plurality of pockets by a pair of outermost transverse lines of attachment and a plurality of spaced interior transverse lines of attachment, each pocket containing a single coil spring, said outermost transverse lines of attachment extending the full height of said strip and said interior transverse lines of attachment extending less than the full height of said strip wherein each of said coil springs of said band of springs has a foam cylinder located inside said central convolutions of said coil spring between said upper and lower end turns and wherein the foam cylinders inside select strips have a different density than the foam cylinders contained in other strips of the bedding or seating product in order to posturize the product.

18. A series of parallel strips for use in the manufacture of bedding and seating products, each strip comprising integrally connected closed fabric pockets, each pocket containing one helically coiled wire compression spring having its axis disposed transversely of the strip, wherein said pockets are defined between two overlapped plies of fabric strip by spaced transverse lines of attachment of the plies to one another and by connection of said plies along a longitudinal line of attachment, a pair of outermost transverse lines of attachment having a length greater than the transverse lines of attachment between the outermost transverse lines of attachment, and each helically coiled compression spring contained in said strip being formed from and part of a longitudinally extending band of springs disposed side by side and connected together in top and bottom faces of the band, said band of springs being formed form a single length of wire formed into a plurality of transversely extending parallel coil springs, each of said coil springs having an axis, said coil springs being arranged in axial alignment with the axes of the coil springs of a band of springs being located in a common plane, said coil springs of each band being arranged in a row and interconnected by interconnecting segments of wire located alternately in the top and bottom faces of the band.

19. The series of parallel strips of claim 18 wherein select helically coiled compression springs have a pocketed spring located inside said helically coiled compression spring.

20. The series of parallel strips of claim 18 wherein select helically coiled compression springs have a foam cylinder located inside said helically coiled compression spring.

21. A pocketed coil spring assembly having a plurality of longitudinally extending strips of integrally connected closed fabric pockets, each strip having a top surface and a bottom surface, the distance between said top and bottom surfaces defining the height of said strip, each pocket of each strip containing only a single helically coiled wire compression spring having its axis disposed transversely of the strip, and wherein said pockets are defined between two overlapped plies of fabric by spaced transverse lines of attachment of the plies to one another and by connection of said plies together along spaced longitudinal lines of attachment, at least one of said transverse lines of attachment being of a length less than the height of said strip, and each helically coiled compression spring contained in each strip being formed from and being part of a longitudinally extending band of springs disposed side by side and connected together in top and bottom faces of the band, said band of springs being formed from a single length of wire formed into a plurality of parallel coil springs, each of said coil springs having an axis, said coil springs being arranged in axial alignment with the axes of the coil springs of a band of springs being located in a common longitudinal plane, said coil springs of each band being arranged in a row and interconnected by interconnecting segments of wire located alternately in the top and bottom faces of the band, each of said interconnecting segments comprising a linear segment and two end segments, each end segment joining one end of said linear segment to one of said coil springs, each coil spring of a band of springs being of a hand opposite to the hand of the adjacent coil springs of the band immediately before and after it in the row wherein a pair of outermost transverse lines of attachment are of a length approximately equal to the height of said strip and wherein said transverse lines of attachment between said outermost transverse lines of attachment extend alternatively upwardly and downwardly from said top and bottom surfaces of said strip.

22. A bedding or seating product comprising:

a pocketed spring assembly comprising plurality of parallel, fabric strips joined to each other, each of said fabric strips having a fixed height and containing a continuous band of coil springs, said band of coil springs being formed from a single length of wire formed into a plurality of parallel coil springs, each of said coil springs having an upper end turn, a lower end turn and a plurality of central convolutions between said end turns, said central convolutions defining an axis of said coil spring, said coil springs of said band being arranged in a row and interconnected by interconnecting segments of wire located alternatively in top and bottom faces of the band, said fabric strip being divided into a plurality of pockets by transverse lines of attachment, each pocket containing a single coil spring, wherein within select strips a pair of adjacent coil springs are separated by two spaced transverse lines of attachment, said product being posturized due to said select strips being less firm than said strips in which only one transverse line of attachment separates adjacent pockets.

* * * * *